(12) United States Patent
Watanabe

(10) Patent No.: US 7,631,889 B2
(45) Date of Patent: Dec. 15, 2009

(54) AIRBAG INSTALLATION STRUCTURE

(75) Inventor: Seiji Watanabe, Tokyo (JP)

(73) Assignee: Takata Corporation, Tokyo (JP)

( * ) Notice: Subject to any disclaimer, the term of this patent is extended or adjusted under 35 U.S.C. 154(b) by 247 days.

(21) Appl. No.: 11/276,579

(22) Filed: Mar. 6, 2006

(65) Prior Publication Data

US 2006/0197316 A1   Sep. 7, 2006

Related U.S. Application Data

(60) Provisional application No. 60/658,594, filed on Mar. 7, 2005.

(51) Int. Cl.
*B60R 21/16* (2006.01)
(52) U.S. Cl. .................. 280/728.2; 280/730.2
(58) Field of Classification Search .............. 280/730.2, 280/728.2
See application file for complete search history.

(56) References Cited

U.S. PATENT DOCUMENTS

| | | | |
|---|---|---|---|
| 5,062,664 A * | 11/1991 | Bishop et al. ............. | 280/728.2 |
| 6,971,668 B2 | 12/2005 | Heigl | |
| 7,097,200 B2 * | 8/2006 | Wold ....................... | 280/730.2 |
| 7,163,231 B2 * | 1/2007 | Kumagai .................. | 280/730.2 |
| 7,246,817 B2 * | 7/2007 | Tanase ..................... | 280/730.2 |
| 7,303,206 B2 * | 12/2007 | Kippschull et al. ....... | 280/728.2 |
| 2007/0090630 A1 * | 4/2007 | Wilmot .................... | 280/728.2 |
| 2007/0126214 A1 * | 6/2007 | Quach et al. ............. | 280/730.2 |
| 2007/0132217 A1 * | 6/2007 | Seong ...................... | 280/730.2 |

FOREIGN PATENT DOCUMENTS

| JP | 10-203288 | 8/1998 |
|---|---|---|
| JP | 2004-359044 | 12/2004 |

* cited by examiner

*Primary Examiner*—Faye M. Fleming
(74) *Attorney, Agent, or Firm*—Foley & Lardner LLP

(57) ABSTRACT

An airbag module installation system includes an airbag module with an airbag and a case configured to hold the airbag module prior to and during installation of the airbag module into a vehicle. The installation system may include a "one-touch" clip configured to fasten the airbag module to a vehicle body. The installation system can be permanently fastened to the vehicle body and control deployment direction of an airbag. The installation system can also provide temporary fixing of the airbag module to a vehicle body.

21 Claims, 7 Drawing Sheets

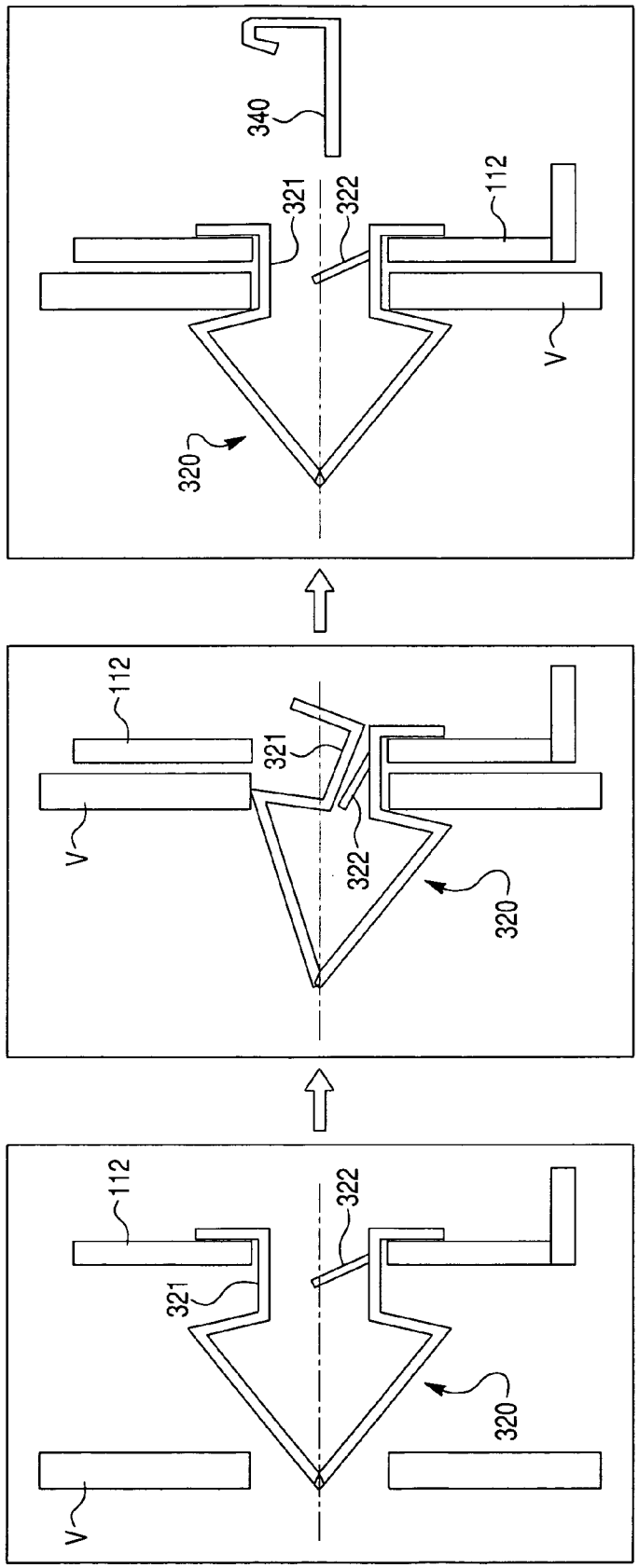

AIRBAG INSTALLATION STRUCTURE

CROSS-REFERENCE TO RELATED PATENT APPLICATIONS

This application claims the benefit under 35 U.S.C. 119(e) of U.S. Provisional Application No. 60/658,594 filed Mar. 7, 2005, which is incorporated herein by reference in its entirety.

BACKGROUND

The application refers to a system, device and method for installing an airbag and/or an airbag module in a motor vehicle. For example, the application discloses side curtain type airbags (e.g., Head Side Airbags or HSABs), which are typically installed along the side of a vehicle. The curtain type airbags are typically designed to unfold or unroll downward to inflate between a vehicle occupant and a side of the vehicle. The side curtain airbag contained in a module that is typically attached to a portion of the vehicle body such as, for example, a roof rail.

The present application discloses an improved structure for attaching an airbag to a vehicle body.

SUMMARY

According to one embodiment, an airbag module installation system is provided. The installation system comprises an airbag module with an airbag and a case configured to hold the airbag module prior to and during installation of the airbag module into a vehicle.

According to another embodiment, an airbag module installation system is provided. The installation system comprises an airbag module and a clip. The clip is configured to fasten a bracket of the airbag module to a vehicle body.

According to another embodiment, an airbag module installation system is provided. The installation system comprises an airbag module with an airbag; a case configured to hold the airbag module prior to and during installation of the airbag module into a vehicle; and a clip. The clip is configured to fasten a bracket of the airbag module to a vehicle body.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1(a) illustrates a side view of an airbag module and a case before the case attaches to the module. FIG. 1(b) illustrates one structure of the case according to an embodiment of the invention. FIG. 1(c) illustrates one structure of the case according to another embodiment of the invention. FIG. 1(d) illustrates another structure of the case according to an embodiment of the invention.

FIG. 2(a) illustrates a side view of the case attached to the airbag module. FIG. 2(b) is a side view of the case after being removed from the airbag module. FIG. 2(b) is a front view of the case attached to the airbag module. FIG. 2(d) is a detail view of the circled portion of the case of FIG. 2(a). FIG. 2(e) illustrates a view of the case along line A-A of FIG. 2(b). FIG. 2(f) illustrates another view of the case with a hook according to another embodiment of the invention.

FIGS. 3(b) to 3(d) show an embodiment of the present invention for using a one-touch clip. FIG. 3(b) illustrates the clip attached to a bracket of an airbag module. FIG. 3(c) illustrates the clip of FIG. 3(a) in the initial stage of fixing the bracket to a vehicle body. FIG. 3(d) illustrates the clip of FIG. 3(a) fixing the bracket to the vehicle body and a tool for the clip.

FIG. 4(a) illustrates the subassembly along a roof portion of a vehicle. FIG. 4(b) illustrate a portion of the module along line B-B of FIG. 4(a).

DETAILED DESCRIPTION

Figure 1A:
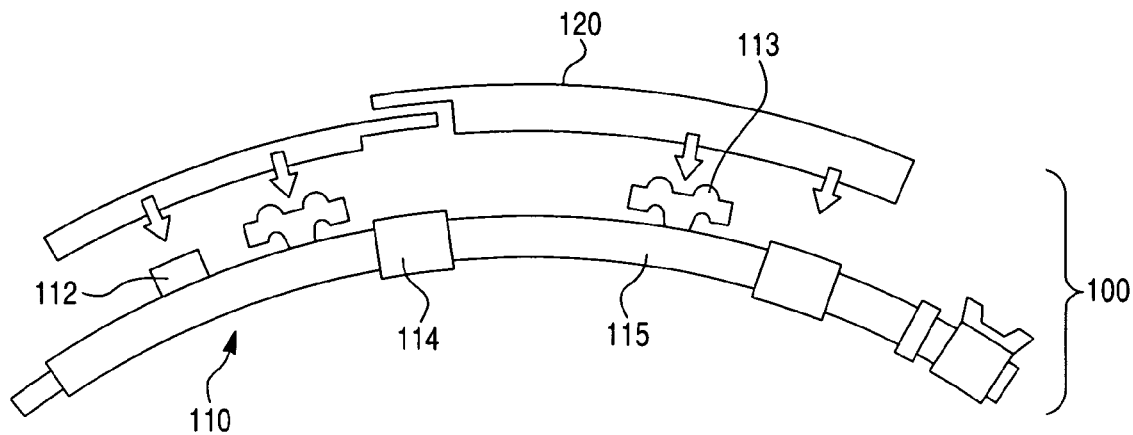
FIGS. 1(a) to 1(d) show embodiments of the present invention for a plastic hard case for an airbag module.

The present application relates to a simplified system for installing an airbag or airbag module in a vehicle. In particular, the present application discloses a simplified system for installing a side curtain type airbag, or a head side curtain type airbag or module in a vehicle. The system can reduce the workload for installation workers.

In an embodiment of the present invention, an airbag module installation system is provided that includes a plastic hard case for the airbag module. The airbag module may include an airbag module. The plastic hard case holds the airbag module, making it easier for workers to move and install the module in a vehicle. This embodiment provides improved workability, restricts the bag package from contacting a vehicle headlining, allows additional control or influence on the direction of inflation, and prevents the airbag from twisting. The plastic hard case may include a click or clip for temporarily fixing the module, minimizing the time that workers have to hold the module.

According to an embodiment of the present invention, a one-touch clip is provided for installing airbag modules. The clip is made of a material, such as a spring or a flexible material, that is used to connect the module. This clip allows fastening of a module with one touch. The clip may also lock the module into place and not be removable without the aid of a tool.

In an embodiment of the current invention, a subassembly is provided for fixing an airbag module to a roof headlining. The subassembly may include a clip for temporarily fixing the module in place. After the airbag module is connected to the roof, the module may be fixed to the body of a vehicle. This embodiment allows workers to work in more comfortable positions and allows an airbag module and the vehicle body to be fixed temporarily when bringing the roof into the vehicle, reducing the workload for workers.

According to an embodiment of the current invention, brackets for installing an airbag module are enlarged or integrated. For example, the brackets may be used to install an airbag module at three points instead of six points. This embodiment allows the brackets to protect the airbag from the body edge, protects the airbag from twisting, and reduces the workload for workers.

In an embodiment of the current invention, a module hard case is supplemented so that the case is removable after the module is fixed or installed. For example, the hard case may have a structure that enables it to fix the module to the vehicle body. This embodiment allows fixing of the module to a vehicle body to be easier, prevents the airbag from twisting, and reduces the workload for workers.

Hereinafter, embodiments of the present invention will be described with reference to the attached drawings.

FIGS. 1(a) to 1(d) show embodiments of the present invention in which an airbag module installation system 100 is provided. The installation system 100 includes a case 120 for an airbag module 110. The airbag module 110 includes an airbag 115 and brackets 112 or fabric tab extensions of the airbag 115. The airbag module 110 may also include mounting brackets 113, shown in FIG. 1(a). The airbag 115 may be enclosed by a cloth wrap or straps, such as straps 114.

The case 120 holds the airbag module 110 making it easier for workers to move and install the module 110 in a vehicle. The case 120 is configured to be permanently mounted onto a vehicle body V and/or permanently mounted on an airbag module 110. The case 120, due to its shape and/or position on the airbag module 110, can help control a deployment direction of the airbag 115. For example, by positioning the case 120 on a top portion and over end portions of the airbag module 110 the case 120 can help direct the airbag 115 deploy in a downward direction. The case 120 can be positioned in any appropriate location on the airbag module 110 depending on a desired deployment direction.

This embodiment may provide improved workability, restrict the airbag and/or airbag module 110 from contacting a vehicle headlining, allow additional control or influence on the direction of inflation of the airbag 115, and prevent the airbag 115 from twisting. The case 120 may fit on a top portion, an underside portion, or completely surround the airbag module 110. FIG. 1(a) illustrates the case 120 prior to fastening to the airbag module 110.

Figure 1B:
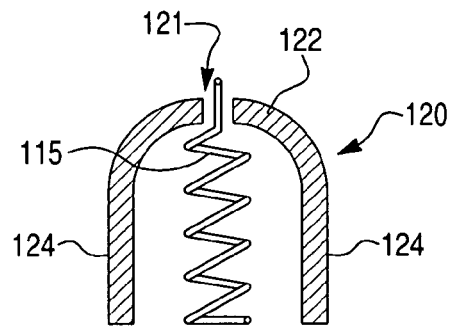

As shown in FIG. 1(b), the case 120 may include a structure such having a top wall 122 and two opposing side walls 124 depending from the top wall 122. The top wall 122 includes an opening 121 through which a tab or ear of an airbag 115 may extend.

Figure 1C:
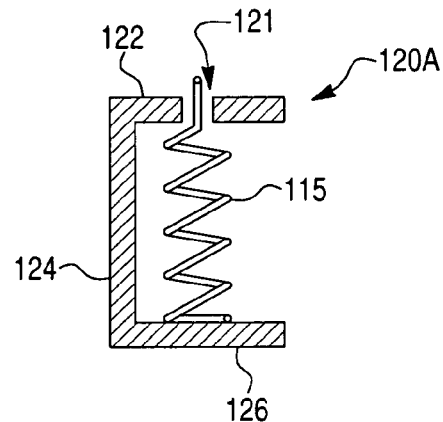

According to the embodiment of FIG. 1(c), the case 120A includes a top wall 122 with an opening 121 and a side wall 124 depend from the top wall 122. The case 120A further includes a bottom wall 126 extending from a lower portion of the side wall 124.

Figure 1D:
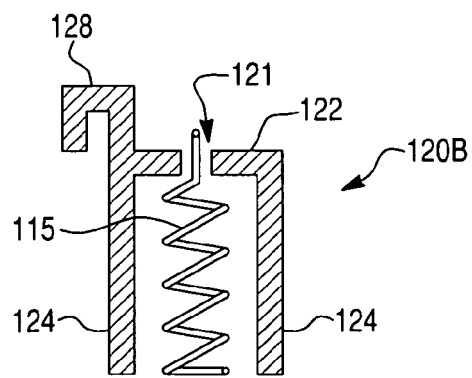

The embodiment shown in FIG. 1(d) includes a case 120B with a top wall 122 having an opening 121 and two opposing side walls 124 depend from the top wall 122. The case 120B further includes a hook 128 extending from one of the side walls 124. The hook 128 is configured to temporarily attach the ease 120B to a vehicle body. The hook 128 may minimize the time that workers have to hold the module 110.

It will be recognized that the various structures shown in FIGS. 1(b) to 1(d) are exemplary only. The case 120, 120A, 120B can have any suitable structure.

FIGS. 2(a) to 2(d) show embodiments of the current invention in which a module hard case 220 is supplemented so that the case 220 is removable after the module 110 is fixed or installed to a vehicle body V. For example, the hard case 220 may have a structure that enables it to fix the module 110 to the vehicle body V. This embodiment allows fixing of the module 110 to a vehicle body V to be easier, prevents the airbag 115 from twisting, and reduces the workload for workers. The case 220 may serve as a jig to enable easier installation of the module by holding the airbag module 110 firmly and guiding the module 110 to its proper location in the vehicle body V. The case 120 is removed following installation.

Figure 2A:
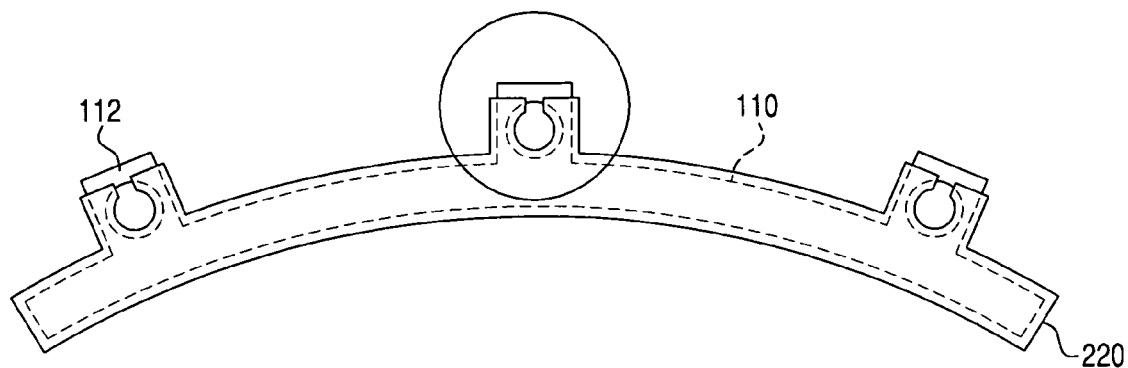
FIGS. 2(a) to 2(f) show embodiments of the present invention for using a supplemented case to install an airbag module.
Figure 2B:
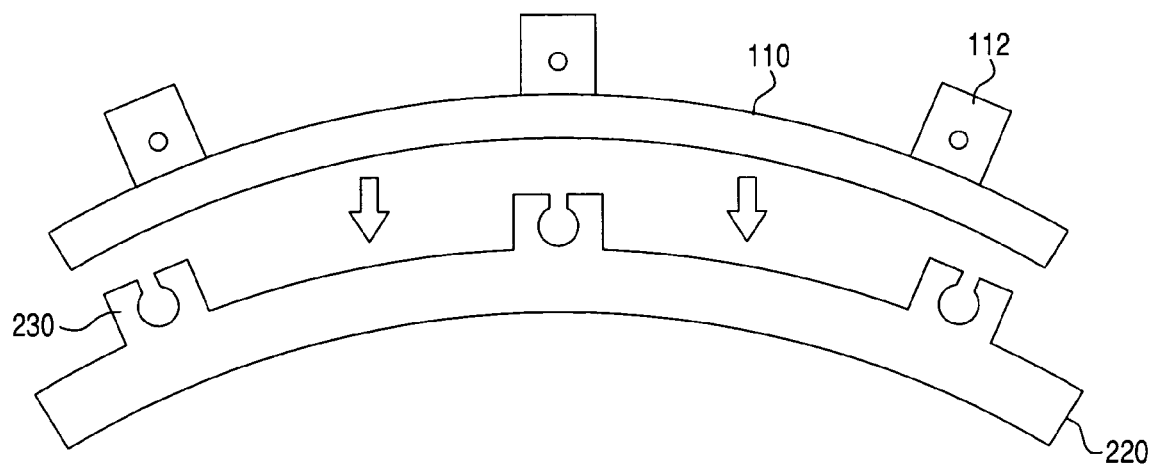
Figure 2C:
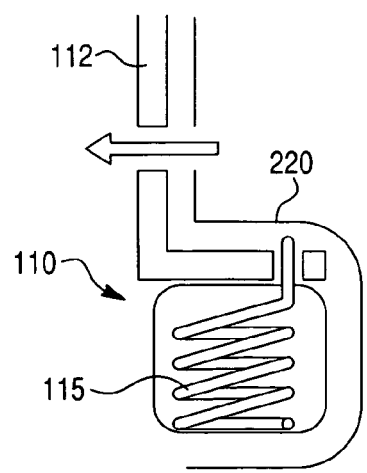
Figure 2D:
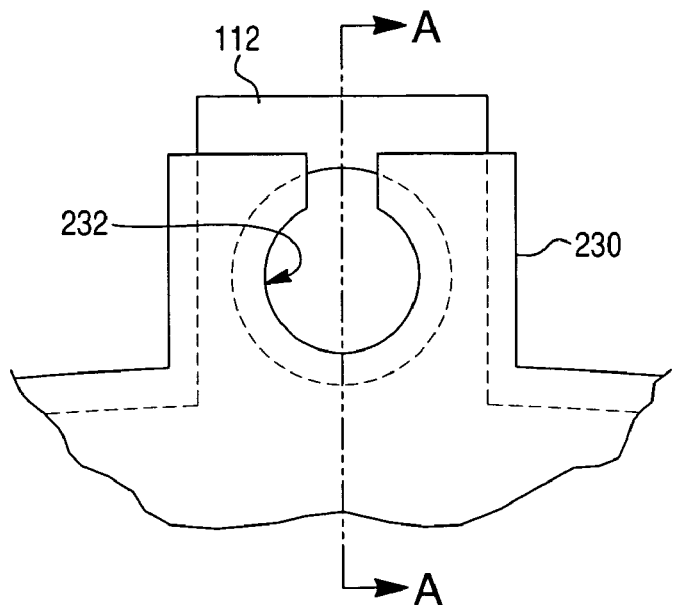
Figure 2E:
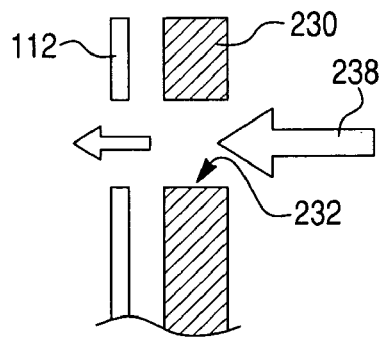

FIGS. 2(a) to 2(e) illustrate the airbag installation system 200 with the airbag module 110 and case 220. The case 220 includes a connector tab 230 for connecting the case 220 to the airbag module 110. FIG. 2(a) illustrates a side view of the case 220 connected to the airbag module 110. FIG. 2(b) illustrates the case 220 as the case 220 is being removed from the airbag module 110. FIG. 2(c) illustrates a side view of the case 220 and airbag module 110.

The case 220 fits around the module 110 in a snap-fit manner, or any other suitable manner, such as hooks, clips, etc. A connector tab 230 of the case 220 extends adjacent to the bracket 112 of the module 110. The connector tab 230 includes an opening 232 that aligns with an opening in the bracket 112 to permit a clip 238 (shown in FIG. 2(e)) to fasten the module 110 to a vehicle body V. Alternatively, the connector tab may align with a portion of the airbag 115 that connects to the vehicle body V via an opening. After the module 110 is attached to the vehicle body V, the opening 232 permits the case 220 to be removed from the module 110.

It will be recognized that the case 220 may have any suitable shape or structure such that the case 220 serves as a jig in the installation of the airbag module 110 and is removable after installation. Further, the airbag module 115 may include the cloth wrap or straps 114 and/or the mounting brackets 113 such as shown in FIG. 1(a).

Figure 2F:
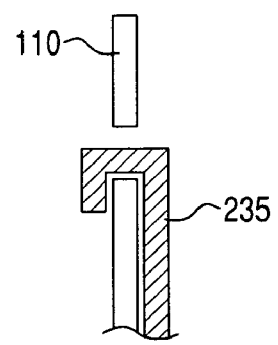

FIG. 2(f) illustrates another embodiment in which the case 220 includes a hook 235 configured to connect the case 220 to the airbag module 110. Alternatively, the case 220 may include a hook, to temporarily fix the case 220 and, thus, the airbag module 110 to the vehicle body.

Figure 3A:
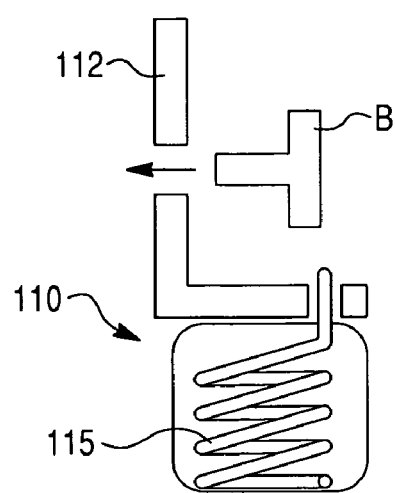
FIG. 3(a) shows a conventional system for fixing an airbag module to a vehicle.

FIG. 3(a) shows a conventional system for fastening an airbag module 110 to a vehicle body. This system requires large workloads for workers because the workers have to bolt down fixing points. In the conventional example, a bolt B is required to fix the module to a vehicle body. The bolt B extends through a bracket 112 of an airbag module 110, which in turn connects to a vehicle body V.

FIGS. 3(b) to 3(d) show an embodiment of the current invention in which a one-touch clip 320 is provided for installing airbag modules 110. The clip 320 is made of a material, such as a spring or a flexible material, that is used to connect the module 110 to a vehicle body V via a bracket 112. This clip 320 allows fastening of a module 120 with one touch; no bolting or other manual work is required. Clip 320 is used to fasten the bracket 112. Part 321 of the clip 320 is movable before fastening of the bracket 112 to the vehicle body V due to the structure, size of part 321 and/or part 322. When the module 110 is fixed with the vehicle body V, part 321 is no longer movable because portion 322 locks part 322.

Before connecting a vehicle body V, portion 322 is capable of releasing into an unlocked position. When the clip 320 fastens together the bracket 112 and vehicle body V, part 321 is substantially inserted/surrounded by bracket 112 and/or vehicle body V. In this position, any movement of part 321 is prevented that would allow portion 322 to unlock.

According to an embodiment, a tool 340 may be required to remove or release the clip 320 from the module 110. The tool 340 extends into the clip 320, releases portion 322 and, thus allows part 321 to move.

Figure 4A:
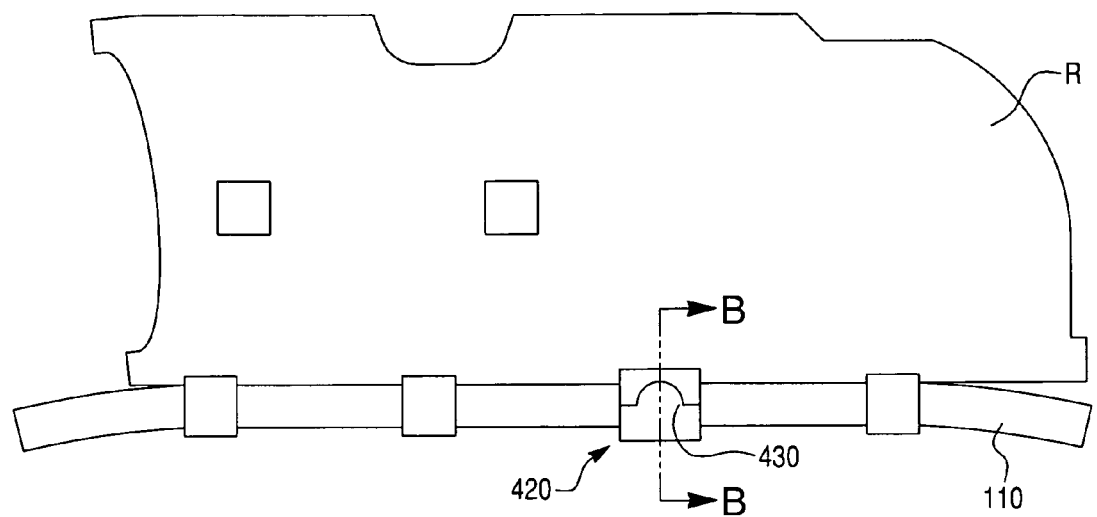
FIGS. 4(a) and 4(b) show an embodiment of the present invention for using a subassembly to install an airbag module.
Figure 4B:
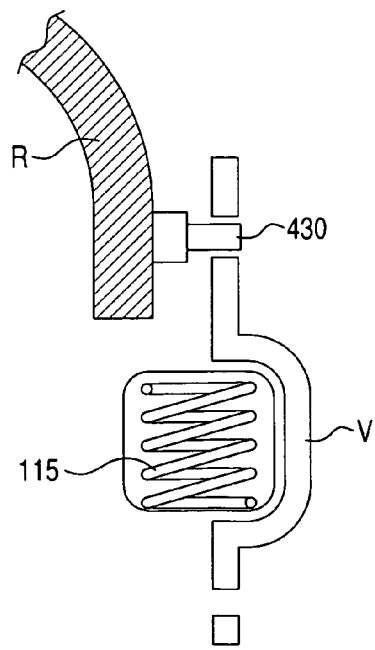

FIGS. 4(a) and 4(b) show an embodiment of the current invention in which a subassembly 420 is provided for fixing an airbag module 110 to a roof headlining R. After the airbag module 110 is temporarily connected to the roof headlining R with the subassembly 420, the module 110 may be fixed to the body of a vehicle V. The subassembly 420 may include a clip 420 for temporarily fixing the module 110 in place. This embodiment allows workers to work in more comfortable positions and allows an airbag module 110 and the vehicle body to be fixed temporarily when bringing the roof R into the vehicle, reducing the workload for workers.

Figure 5A:
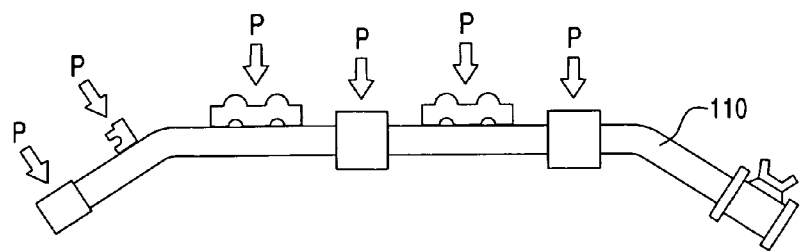
FIG. 5(a) shows a conventional system of installing an airbag module to a vehicle body.

FIG. 5(a) illustrates a conventional method of installing an airbag module to a vehicle body. In the conventional method, the airbag module is fixed on at least six locations or points P along the airbag module.

Figure 5B:
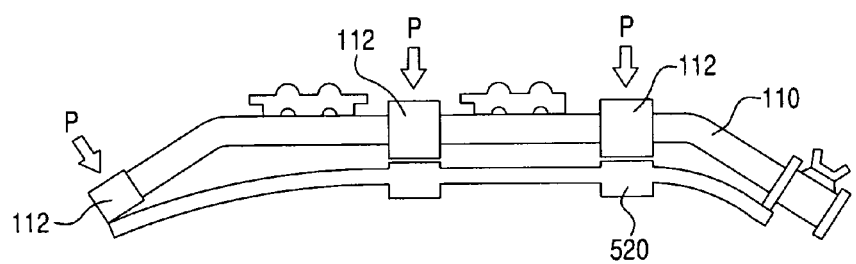
FIG. 5(b) illustrates an embodiment of the present invention for using an enlarged or integrated bracket to install an airbag module.

FIG. 5(b) shows an embodiment of the current invention in which brackets 112 for installing an airbag module 110 are enlarged or integrated. For example, the brackets 112 may be used to install an airbag module 110 at three points P instead of six points P. In conventional systems for installing airbag modules, workers have to remain in a half-sitting position with their arms up for an extended period of time to fix a module with six points. This embodiment allows the brackets 112 to protect the airbag 115 from a vehicle body edge, protect the airbag 115 from twisting, and reduce the workload for workers. This embodiment can also retain the strength of the bracket 112 while simplifying the workload for workers.

It will be recognized that the case 120, 120A, 120B, 220, 420 and/or 520 may be made of plastic or any other suitable material. The case may be hard or soft. In an embodiment, the case is sufficiently hard to prevent deformation of the case during normal handling by a worker and to prevent twisting of the airbag module 110.

It will also be recognized that the clip 128, 320, 430 may be made of a spring or a flexible material, or any other suitable material; flexible or inflexible.

The airbag module 110 may be an airbag module or any other type of airbag module.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag module installation system comprising:
an airbag module with an airbag; and
a case configured to hold the airbag module during installation of the airbag module into a vehicle, the case including an opening for a tab of the airbag to extend through; and
a hook extending from a wall of the case, the hook configured to temporarily attach the case to a vehicle body,
wherein the airbag in a folded state includes a top side facing a roof of a vehicle, an inner side facing a vehicle compartment, an outer side opposite the inner side and facing a vehicle window, and a bottom side opposite the top side, and wherein one of the sides of the folded airbag is uncovered by the case when installed in the vehicle.

2. The airbag module installation system of claim 1, wherein the case is made of plastic.

3. The airbag module installation system of claim 1, wherein the case is configured to be permanently mounted on a vehicle body.

4. The airbag module installation system of claim 3, wherein the case is configured to control a deployment direction of the airbag.

5. The airbag module installation system of claim 1, wherein a top wall of the case includes the opening, and the case includes a side wall depending from the top wall and a bottom wall opposing the top wall.

6. The airbag module installation system of claim 1, wherein a top wall of the case includes the opening, and the case includes opposing side walls depending from the top wall.

7. The airbag module installation system of claim 1, wherein the case is configured to temporarily hold the airbag module, the case being removable after the airbag module is mounted on a vehicle body.

8. The airbag module installation system of claim 7, wherein the case further includes a connector tab configured to connect the case and module to a vehicle body.

9. An airbag module installation system comprising:
an airbag module with an airbag; and
a case configured to hold the airbag module during installation of the airbag module into a vehicle,
wherein the airbag in a folded state includes a top side facing a roof of a vehicle, an inner side facing a vehicle compartment, an outer side opposite the inner side and facing a vehicle window, and a bottom side opposite the top side, and wherein one of the sides of the folded airbag is uncovered by the case when installed in the vehicle, and
wherein the case is configured to be removable from the airbag module.

10. An airbag module installation system comprising:
an airbag module with an airbag;
a case configured to hold the airbag module during installation of the airbag module into a vehicle; and
a clip, the clip is configured to fasten a bracket of the airbag module to a vehicle body, and
wherein the airbag in a folded state includes a top side facing a roof of a vehicle, an inner side facing a vehicle compartment, an outer side opposite the inner side and facing a vehicle window, and a bottom side opposite the top side, and wherein one of the sides of the folded airbag is uncovered by the case when installed in the vehicle.

11. The airbag module installation system of claim 10, wherein the clip includes a head portion with a diameter larger than a diameter of an opening in a vehicle body and an opening in the bracket; the head portion is configured to extend through bracket and opening in a vehicle body.

12. The airbag module installation system of claim 11, wherein the clip includes a tail portion, the tail portion is configured to be movable prior to fixing of the clip to a vehicle body and is configured to be immovable after fixing to a vehicle body.

13. The airbag module installation system of claim 12, further comprising a tool configured to unlock the clip to remove the airbag module from a vehicle body.

14. The airbag module installation system of claim 10, wherein the clip is made of a flexible material.

15. The airbag module installation system of claim 10, wherein the case is configured to be permanently mounted on a vehicle body.

16. The airbag module installation system of claim 15, wherein the case is configured to control a deployment direction of the airbag.

17. The airbag module installation system of claim 10, wherein the case is Configured to temporarily hold the airbag module, the case being removable after the airbag module is mounted on a vehicle body.

18. A method of installing an airbag module, comprising:
providing an airbag module with an airbag;
temporarily attaching a case around a portion of the airbag module to hold the airbag module during installation of the airbag module into a vehicle;
fixing the attached airbag module and case to a vehicle body component; and
removing the case from the airbag module after the airbag module is mounted onto the vehicle body component and prior to deployment of the airbag.

19. The method of claim 18, wherein fixing the attached airbag module and case to the vehicle body component includes inserting a clip through aligned openings in the airbag module and case and into the vehicle body component.

20. The method of claim 19, wherein the case includes a connector tab, the connector tab includes the opening for the clip.

21. The method of claim 20, wherein the opening in the case extends up to an edge of the connector tab such that the connector tab is removable from the clip.

* * * * *

UNITED STATES PATENT AND TRADEMARK OFFICE
CERTIFICATE OF CORRECTION

PATENT NO.        : 7,631,889 B2                              Page 1 of 1
APPLICATION NO. : 11/276579
DATED             : December 15, 2009
INVENTOR(S)       : Seiji Watanabe It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 531 days.

Signed and Sealed this

Second Day of November, 2010

David J. Kappos
*Director of the United States Patent and Trademark Office*